(12) United States Patent
Li

(10) Patent No.: US 12,228,433 B2
(45) Date of Patent: Feb. 18, 2025

(54) MOUSE ENCODER WITH HOUSING INCLUDING A ROLLING BEARING AND A ROTATION SHAFT OF A SCROLL WHEEL AND MOUSE WITH THE SAME

(71) Applicant: Dongguan Zhongchi Photoelectricity Technology Co., Ltd., Dongguan (CN)

(72) Inventor: Ling Li, Zixing (CN)

(73) Assignee: Dongguan Zhongchi Photoelectricity Technology Co., Ltd., Dongguan (CN)

( * ) Notice: Subject to any disclaimer, the term of this patent is extended or adjusted under 35 U.S.C. 154(b) by 0 days.

(21) Appl. No.: 18/358,200

(22) Filed: Jul. 25, 2023

(65) Prior Publication Data

US 2024/0418545 A1 Dec. 19, 2024

(30) Foreign Application Priority Data

May 16, 2023 (CN) .......................... 202321179795.8
Jun. 13, 2023 (CN) .......................... 202321500749.3

(51) Int. Cl.
*G01D 5/34* (2006.01)
*G06F 3/0362* (2013.01)

(52) U.S. Cl.
CPC ............. *G01D 5/34* (2013.01); *G06F 3/0362* (2013.01)

(58) Field of Classification Search
CPC ................................ G01D 5/34; G06F 3/0362
See application file for complete search history.

(56) References Cited

U.S. PATENT DOCUMENTS

| 6,137,477 | A * | 10/2000 | Hu | G06F 3/03543 345/169 |
| 2003/0025673 | A1* | 2/2003 | Ledbetter | G06F 3/03543 345/163 |
| 2015/0138093 | A1* | 5/2015 | Young | G06F 3/0312 345/166 |

FOREIGN PATENT DOCUMENTS

GB 2309507 A * 7/1997 ........... G06F 3/0312

* cited by examiner

*Primary Examiner* — Jennifer D Bennett
(74) *Attorney, Agent, or Firm* — Westbridge IP LLC

(57) ABSTRACT

Disclosed are a mouse encoder and a mouse with the same. The mouse encoder includes a housing provided with a mounting cavity; a rolling bearing member arranged in the mounting cavity and an outer ring of the rolling bearing member is fixed to an inner wall surface of the mounting cavity; a grating member including a rotating cylinder and a grating disk sleeved on the rotating cylinder, the grating disk has a plurality of light transmitting slots arranged along a circumference thereof at intervals; a circuit board with a light emitter and a light receiver, and the circuit board is electrically connected with a main board of the mouse; and the light emitter is conductive with the light receiver to form an optical path, when the rotating cylinder is rotated, the grating disk can block or expose the optical path.

19 Claims, 11 Drawing Sheets

MOUSE ENCODER WITH HOUSING INCLUDING A ROLLING BEARING AND A ROTATION SHAFT OF A SCROLL WHEEL AND MOUSE WITH THE SAME

CROSS-REFERENCE TO RELATED APPLICATIONS

This application claims priority to Chinese Patent Application No. 202321179795.8, filed on Jun. 13, 2023, the content of which is incorporated herein by reference in its entirety.

TECHNICAL FIELD

The present application relates to the field of mouses, and in particular to a mouse encoder and a mouse with the same.

BACKGROUND

With the popularity of computers, as the current important input device, a mouse mainly includes a left button, a right button, and a middle scroll wheel to provide up and down page functions and other functions. The scroll wheel is connected with a mouse encoder such that the scroll wheel can be driven to rotate when the mouse is used; the current mouse encoder is divided into two types: grating encoder and mechanical encoder.

In a grating encoder, an infrared transceiver signal is used and the scroll wheel works without substantial contact, thus, the grating encoder has a good stability and a long life; however, since the grating encoder has certain requirements on the master programming, the grating encoder is rarely used currently.

The mechanical encoder is more widely used currently. Compared with the scroll wheel of the grating encoder, the mechanical encoder has advantages such as good mechanical scale feel, simple structure, and easy programming of the master control system of the mechanical encoder, the vast majority of mice are currently using the mechanical encoder as the mouse encoder.

However, there are many types of mouse. With the emergence of a shuttle wheel (a form of mouse encoder), the mouse has more and more functions. However, due to the complex structure and high cost, the shuttle wheel can only be used in a high-level mouse; furthermore, limited by the working principle, the mechanical encoder cannot have the shuttle-like rotation speed.

Since the grating encoder adopts the contactless working principle, the scroll wheel of the grating encoder can have a fast rotation in theory. However, due to the limit by the structure and space, the grating encoder cannot overcome the friction between the grating and the components surrounding the grating, thus the mouse encoder cannot achieve the damping-free and silent scrolling effect, which directly affects the user experience.

SUMMARY

The present disclosure aims to provide a mouse encoder. By combining rolling bearings with grating encoders, a new type of grating mouse encoder with simple structure, good stability, long service life, low damping, and silent effect can be obtained, which can have the shuttle-like feel and service life of a high-level mouse to greatly meet the users' needs, and solve the technical problems of high damping and rolling noise in grating encoders.

In an aspect, the present disclosure provides a mouse encoder, wherein the mouse encoder includes:

a housing provided with a mounting cavity, an end surface of the housing defines a connection hole being connected with a rotation shaft of a scroll wheel, and the connection hole communicates with the mounting cavity;

a rolling bearing member arranged in the mounting cavity and an outer ring of the rolling bearing member is fixed to an inner wall surface of the mounting cavity;

a grating member, including a rotating cylinder and a grating disk sleeved on the rotating cylinder, the grating disk has a plurality of light transmitting slots arranged along a circumference thereof at intervals, the rolling bearing member is sleeved on the rotating cylinder, and an axis of the connection hole, an axis of the rotating cylinder and an axis of the rolling bearing member all lie in the same straight line; and a circuit board arranged in the housing, the circuit board is electrically connected with a light emitter and a light receiver, the circuit board is configured to electrically connect with a main board of the mouse, the light emitter is conductive with the light receiver to form an optical path, when the rotating cylinder rotates, the grating disk is driven by the rotating cylinder to block or expose the optical path.

In some embodiments, the grating member further includes a connection platform radially protruding from an outer wall surface of the rotating cylinder; a side wall of the connection platform adjacent to the rolling bearing member is connected to and in contact with an end surface of an inner ring of the rolling bearing member, and a side wall of the connection platform away from the rolling bearing member is connected to the grating disk; a diameter of the connection platform is greater than an outer diameter of the inner ring of the rolling bearing member and is less than an inner diameter of the outer ring of the rolling bearing member, such that the grating member is fixed only to the inner ring of the rolling bearing member without being in contact with the outer ring of the rolling bearing member and other assembled parts.

In some embodiments, the housing includes a mounting housing and a fixing housing spaced from the mounting housing, the mounting housing includes a mounting plate; a mounting portion is arranged on the mounting plate and protrudes in a direction away from the fixing housing, the mounting cavity is formed in the mounting portion, and the connection hole is defined in an end surface of the mounting portion away from the fixing housing.

In some embodiments, the mounting housing further includes at least one buckle portion arranged on a side and/or a bottom of the mounting housing, the buckle portion engage with a corresponding boss arranged on the fixing housing; and/or the housing further forms an assembly cavity communicating with the mounting cavity, the grating disk is located in the assembly cavity, and the rotating cylinder is located partly in the assembly cavity and partly in the mounting cavity.

In some embodiments, a rotating space is formed inside the fixing housing, and the grating disk is rotatably arranged in the rotating space; a light transmitting cavity is formed in a lower part of the fixing housing, and the light transmitting cavity communicates with the rotating space; the light emitter and the light receiver are arranged in the light transmitting cavity and are respectively located on both sides of the light transmitting slot.

In some embodiments, a through hole is defined in an end surface of a side wall of the fixing housing away from the mounting housing, the through hole communicates with the rotating space and is concentric with the connection hole.

In some embodiments, the mounting housing defines a mounting hole and a mounting post engageable with the mounting hole is arranged on a side wall of the fixing housing facing the housing; and/or the light transmitting cavity communicates with the through hole.

In some embodiments, a radial size of the connection hole is greater than or equal to that of the inner ring of the rolling bearing member such that the mounting portion avoids an end surface of the fixing housing away from the inner ring; the radial size of the connection hole is less than or equal to that of the outer ring of the rolling bearing member such that an end surface of the outer ring adjacent to the connection hole abuts an inner side wall of the mounting cavity.

In some embodiments, the grating disk includes a connecting disk and a light transmitting disk, the connecting disk is arranged on the rotating cylinder and is capable of rotating with the rotating cylinder, the light transmitting disk extends axially from an outer edge of the connecting disk in a direction away from the rolling bearing member, and the light transmitting slots are formed at intervals in the light transmitting disk; and/or the rotating cylinder is detachably connected to the grating disk.

In some embodiments, the mouse encoder further includes a fixing plate in parallel with the housing, the circuit board is arranged between the housing and the fixing plate, the fixing plate is fastened to the housing to clamp at least a part of the circuit board.

In some embodiments, the light emitter and the light receiver are arranged on a board surface of the circuit board facing the housing;

the housing forms a rotating space in which the grating disk rotates, an avoidance hole is defined in a side wall of the circuit board on which the circuit board is mounted; the avoidance hole communicates with the rotating space, and the light emitter and the light receiver engage with the grating disk through the avoidance hole.

In some embodiments, the circuit board is a complete board, the circuit board blocks the avoidance hole; or a first via is defined in the circuit board, the circuit board covers the avoidance hole, and the fixing plate blocks the first via.

In some embodiments, wherein a first via is defined in the circuit board and a second via corresponding to the first via is defined in the fixing plate, the first via and the second via communicate with the rotating space and the mounting cavity through the avoidance hole, such that the rotation shaft of the scroll wheel can be connected with one end of the rotating cylinder away from the connection hole through the first via, the second via, and the avoidance hole.

In some embodiments, wherein the circuit board is a flexible circuit board including a board body and a flexible cable connected to the board body; an end of the flexible cable away from the board body is configured to be inserted to a main board, and the board body is clamped between the fixing plate and the housing.

In some embodiments, the board body has a first board surface facing the housing and a second board surface facing the fixing plate, the first board surface is attached to a surface of the housing, and the second board surface is attached to the fixing plate; and/or one end of the flexible cable is connected to a connection end of the board body, and an avoidance notch is formed in the fixing plate corresponding to the connecting end through which the flexible cable can pass.

In some embodiments, at least one fastener is arranged on a side of the fixing plate, and at least one clamping protrusion corresponding to the fastener is arranged on a side of the housing, and the fastener engages with the clamping protrusion.

In some embodiments, the housing includes a mounting housing and a fixing housing spaced from the mounting housing, the mounting housing further comprises at least one buckle portion arranged on a side of the mounting housing, the buckle portion engages with a corresponding boss arranged on the fixing housing;

the clamping protrusion and the boss are arranged along a height direction of the fixing housing, and the buckle portion and the fastener are staggered.

In some embodiments, a side of the boss facing the mounting housing forms a first guiding slope used to guide the buckle portion to engage with the boss; and/or a side of the clamping protrusion facing the fixing plate forms a second guiding slope used to guide the fastener to engage with the boss; and/or at least one sink is formed in a side of the fixing housing, the clamping protrusion is located in the corresponding sink, when the fastener engages with the corresponding boss, the fastener is received in the corresponding sink; the mounting housing comprises a mounting plate and a covering sidewall extending from the mounting plate towards the fixing housing, the fastener is formed on the covering sidewall; when the fastener engages with the corresponding boss, and the covering sidewall covers the corresponding side of the fixing housing and the corresponding sink.

In some embodiments, a positioning post is arranged on one side of the housing facing the circuit board, a first positioning hole is defined in the circuit board corresponding to the positioning post, a second positioning hole is defined in the fixing plate corresponding to the positioning post, the positioning post is inserted in the first positioning hole and the second positioning hole.

In another aspect, the present disclosure further provides a mouse including a main board and the above mouse encoder mounted on the main board.

In the technical solution of the present disclosure, in the assembly of the mouse, one end of the rotation shaft of the mouse wheel is inserted into the rotating cylinder of the grating member of the mouse encoder, and a force is generated by manually moving the scroll wheel to drive the grating member to rotate (due to the inserting connection between the rotation shaft of the scroll wheel and the rotating cylinder). Since the grating member is fixed to the inner ring of the rolling bearing member, the inner ring of the rolling bearing member is capable of synchronously rotating with the grating disk to significantly reduce the friction required to overcome when the scroll wheel rotates, which can realize the synchronous rotation speed between the grating member and the scroll wheel as well as reduce the rolling friction coefficient of the scroll wheel and provide a silent effect, thereby providing the no-damping speed rotation experience to the users.

BRIEF DESCRIPTION OF THE DRAWINGS

In order to explain the technical solutions in the embodiments of the present disclosure or the prior art more clearly, the drawings used by the description of the embodiments or the prior art will be briefly introduced below. Obviously, the drawings in the following description may be merely some embodiments of the present disclosure. For those of ordinary skilled in the art, other drawings may be obtained according to the structures shown in the drawings without creative effort.

Figure 1:
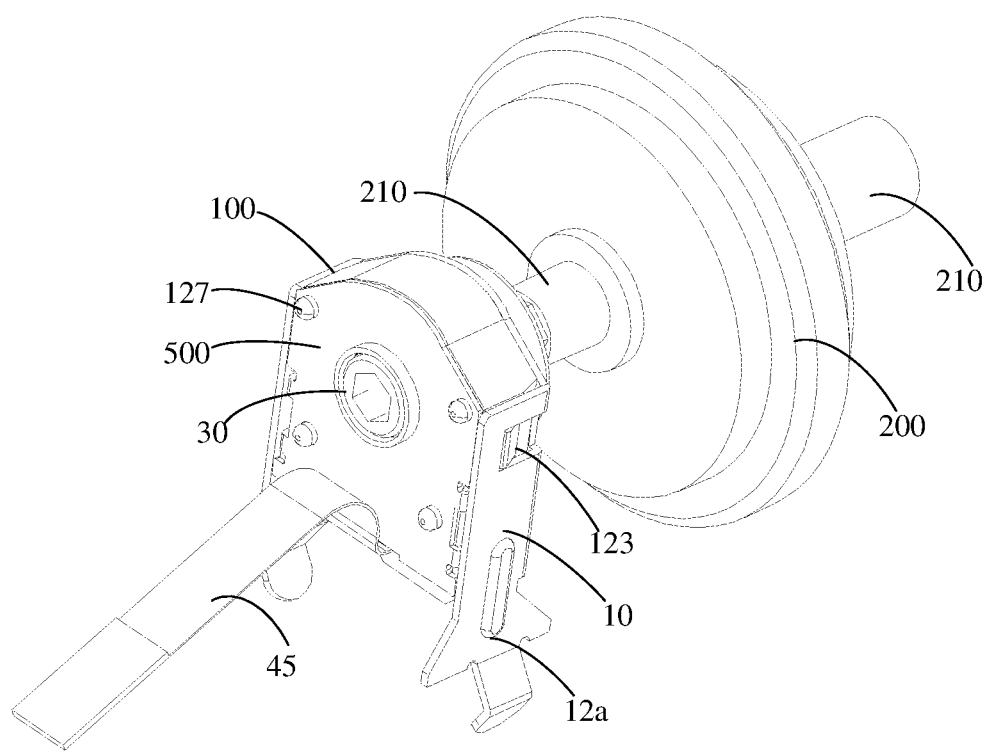
FIG. 1 is a schematic diagram of a mouse encoder in accordance with an embodiment of the present disclosure.
Figure 2:
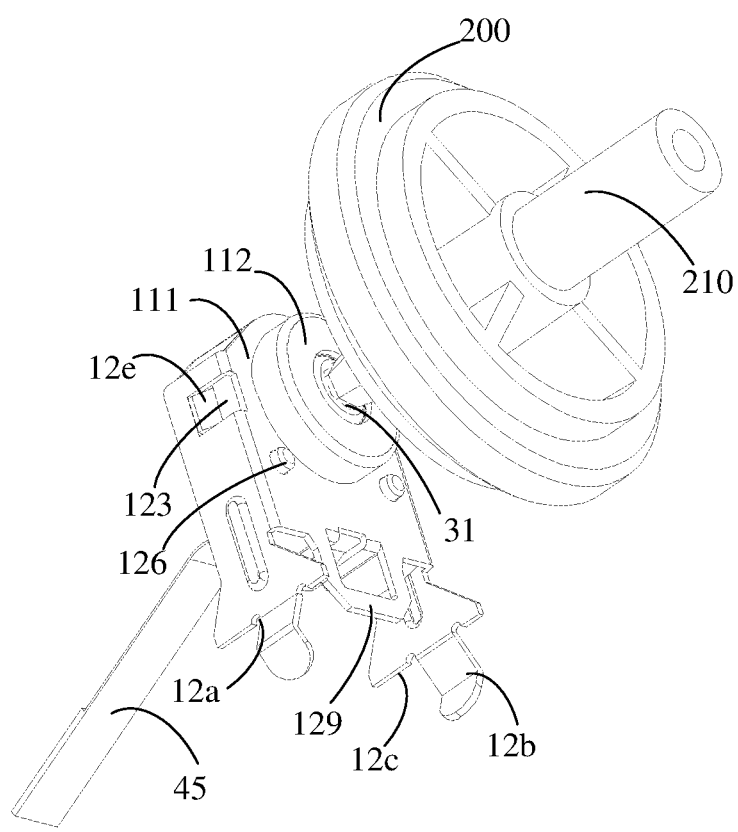
FIG. 2 is a schematic diagram of the mouse encoder viewed from another angle in accordance with an embodiment of the present disclosure.

The realization of the purpose, functional features and advantages of the present application will be further described with reference to the accompanying drawings in conjunction with the embodiments.

DETAILED DESCRIPTION OF THE EMBODIMENTS

In the following, the technical solutions in the embodiments of the present disclosure will be clearly and completely described with reference to the drawings in the embodiments of the present disclosure. Obviously, the described embodiments may be only a part of the embodiments of the present disclosure, but not all of the embodiments. Based on the embodiments of the present disclosure, all other embodiments obtained by those of ordinary skilled in the art without creative effort shall fall within the protection scope of the present disclosure.

It is to be understood that, all of the directional instructions in the exemplary embodiments of the present disclosure (such as top, down, left, right, front, back . . . ) can only be used for explaining relative position relations, moving condition of the elements under a form (referring to figures), and so on, if the form changes, the directional instructions changes accordingly.

In addition, descriptions such as "first" and "second" in the present disclosure may be for descriptive purposes only, and cannot be understood as indicating or implying the relative importance or implicitly indicating the number of indicated technical features. Therefore, the features defined as "first" and "second" may explicitly or implicitly include at least one of the features. In addition, the meaning of "and/or" appearing in the context means including three parallel solutions, taking "A and/or B" as an example, "A and/or B" includes only solution A, or only solution B, or both solutions A and B. In addition, the technical solutions among the various embodiments can be combined with each other, but the combinations must be based on what can be achieved by those of ordinary skill in the art. When a combination of technical solutions is contradictory or cannot be achieved, it should be considered that such a combination of technical solutions does not exist and is not within the protection scope claimed by the present application.

The present disclosure provides a mouse encoder 100.

As shown in FIGS. 1 to 6, the mouse encoder 100 includes a housing 10, a rolling bearing member 20, a grating member 30, and a circuit board 40. The housing 10 forms a mounting cavity 113. A connection hole 13 is defined in an end surface of the housing 10 and is connected with a rotation shaft 210 of a scroll wheel 200 of the mouse encoder 100. The connection hole 13 communicates with the mounting cavity 113.

The rolling bearing member 20 is arranged in the mounting cavity 113. An outer ring 21 of the rolling bearing member 20 is fixed to an inner wall surface of the mounting cavity 113. An outer wall surface of the outer ring 21 is attached to the inner wall surface of the mounting cavity 113, and the outer ring 21 is clamped in the mounting cavity 113.

The grating member 30 includes a rotating cylinder 31 and a grating disk 32 sleeved on the rotating cylinder 31. The grating disk 32 includes a plurality of light transmitting slots 33 formed along a circumference of the grating disk 32 at intervals. An inner ring 22 of the rolling bearing member 20 is sleeved on the rotating cylinder 31. An axis of the connection hole 13, an axis of the rotating cylinder 31, an axis of the connection hole 13, an axis of the rotating cylinder 31 and an axis of the rolling bearing member 20 all lie in the same straight line.

The circuit board 40 covers the mounting cavity. The circuit board 40 includes a light emitter 41 and a light receiver 42. The circuit board 40 is electrically connected to a main board of the mouse, the light emitter 41 is conductive with the light receiver 42 to form an optical path. When the rotating cylinder 31 rotates, the grating disk 32 is driven to rotate by the rotating cylinder 31, thus, the grating disk 32 is capable of blocking or exposing the optical path.

In this embodiment, by manually moving the scroll wheel 200, a force is generated to drive the grating member 30 to rotate (due to the insertion connection between the rotation shaft 210 of the scroll wheel 200 and the rotating cylinder 31); since the grating member 30 is fixed to the inner ring 22 of the rolling bearing member 20, the inner ring 22 of the rolling bearing member 30 is capable of synchronously rotating with the grating disk 32 to significantly reduce the friction to be overcome when the scroll wheel 200 rotates, which can realize the synchronous rotation speed between the grating member 30 and the scroll wheel 200 as well as reduce the rolling friction coefficient of the scroll wheel 200 and provide a silent effect, thereby providing the no-damping speed rotation experience to the users.

The bearing is an important component in current mechanical equipment. The bearing is mainly used to support the mechanical rotating body, reduce the friction coefficient during the movement, and ensure the rotary accuracy. The bearings are currently divided into three categories: sliding bearings, joint bearings and rolling bearings. A rolling bearing generally includes four parts including an outer ring, an inner ring, a rolling body, and a cage. According to the shape of the rolling body, the rolling bearings are divided into two major categories including ball bearings and roller bearings.

In the present disclosure, the rolling bearing member 20 is a deep groove ball bearing, which is the most representative rolling bearing. Compared with other types of bearings of the same size, the deep groove ball bearing has a small friction coefficient, a high limitation speed, a simple structure, a low manufacturing cost, and a high precision, can be used without frequent maintenance, and has a large range of sizes and forms; thus, the deep groove ball bearing is the most widely used bearing. The deep groove ball bearing mainly bears radial loads and can also bear certain axial loads. When the deep groove ball bearing only bears the radial loads, a contacting angle is zero. Based on the above characteristics, the deep groove ball bearing is very suitable for the mouse encoder of the technical solution of the present disclosure. It is noted that the bearing is not limited to the deep groove ball bearing in the technical solution of the present disclosure, other types of rolling bearings can also be applied in the technical solution of the present disclosure.

The circuit board is connected to the main board of the mouse to reach the conductive state, and then the rotation shaft 210 of the scroll wheel 200 is inserted into the rotating cylinder 31 from the connection hole 13; at this time, the scroll wheel 200, the rolling bearing member 20 and the grating member 30 are coaxial.

Therefore, when the scroll wheel 200 is driven to rotate forwards by the user, the scroll wheel 200 can drive the grating disk 32 connected thereto to synchronously rotate through the rotation shaft 210. At this time, the grating disk 32 can first block the optical path formed between the light emitter 41 and the light receiver 42 and then re-expose the optical path. The circuit board 40 can detect a change of an optical signal of the optical path and thus identify that the scroll wheel 200 rotates forwards, therefore, the mouse can complete the work of inputting the corresponding command according to the scroll wheel 200. It is noted that in some embodiments, the light receiver 42 can include two units integrated in the same component, including a first receiving unit corresponding to "forwards" and a second receiving unit corresponding to "backwards". When the scroll wheel 200 is driven by the user to rotate backwards, the scroll wheel 200 can drive the grating disk 32 connected thereto to simultaneously rotate. At this time, the grating disk 32 can first block the optical path formed between the light emitter 41 and the light receiver 42 and then re-expose the optical path, the circuit board 40 can detect the change of the optical signal of the optical path, and then identify that the scroll wheel 200 rotates backwards, so that the mouse can complete the work of inputting the corresponding command according to the scroll wheel 200. In the present disclosure, since the outer part of the rotating cylinder 31 is fixed to the inner ring of the rolling bearing member 20, the rotating cylinder 31 has a synchronous rotation speed with the rolling bearing member 20, thus, the scroll wheel 200 has the same friction coefficient and silent effect as the rolling bearing member 20 when rotating backwards and forwards.

The housing 10 can be made of plastic, or metal, or a combination of plastic and metal. When being made of plastic, the housing 10 is relatively light and is beneficial to reducing the overall volume of the mouse, which facilitates the using of the mouse. When being made of metal, the housing 10 has a relatively high strength and is beneficial to extending the service life of the housing 10. Therefore, in some embodiments, the housing 10 can be partly made of metal and partly made of plastic.

The light emitter 41 and the light receiver 42 may be fixed to the circuit board 40 by soldering in order to achieve an electrical connection as well as a mechanical connection. In some embodiments, the light emitter 41 and the light receiver 42 can also be fixedly inserted to the circuit board 40.

Referring to FIGS. 3 to 6, the grating member 30 further includes a connection platform 34 radially protruding from an outer wall surface of the rotating cylinder 31. A side wall of the connection platform 34 adjacent to the rolling bearing member 20 is in contact with the end surface of the inner ring 22 of the rolling bearing member 20, and a side wall of the connection platform 34 away from the rolling bearing member 20 is connected with the grating disk 32. In this embodiment, the outer wall surface of the rotating cylinder 31 is tightly fastened to a hole of the inner ring 22 of the rolling bearing member 20. The connection platform 34 is attached to the inner ring 22 of the rolling bearing member 20 to achieve synchronous rotation of the rotating cylinder 31 and the rolling bearing member 20; moreover, the inner ring 22 of the rolling bearing member 20 is not in contact with the housing 10, thus, no frictional interference is generated between the housing 10 and the rolling bearing member 20.

A diameter of the connection platform 34 is greater than an outer diameter of the inner ring 22 of the rolling bearing member 20 and is less than an inner diameter of the outer ring 21 of the rolling bearing member 20, which ensures that the grating member 30 is only fixed to the inner ring 22 and is not in contact with the outer ring 21 and other assembly components, and thus significantly improves the smoothness of the rotation of the inner ring of the rolling bearing member 20.

Furthermore, referring to FIGS. 4 to 7, the rotating cylinder 31 and the grating disk 32 may be integrally formed; in some other embodiments, the rotating cylinder 31 may be detachably connected with the grating disk 32 to facilitate the replacement of the grating disk 32 with a different number of light transmitting slots 33. It is noted that the connection platform 34 may be formed on the outer wall of the rotating cylinder 31 or in the middle of the grating disk 32. When the rotating cylinder 31 and the grating disk 32 are integrally formed, the connection platform 34 connects the rotating cylinder 31 and the grating disk 32; when the rotating cylinder 31 and the grating disk 32 are independently formed, the connection platform 34 can be located on the rotating cylinder 31 or the grating disk 32. In some embodiments, the connection platform 34 can be partly arranged on the rotating cylinder 31 and partly arranged on the grating disk 32.

Figure 4:
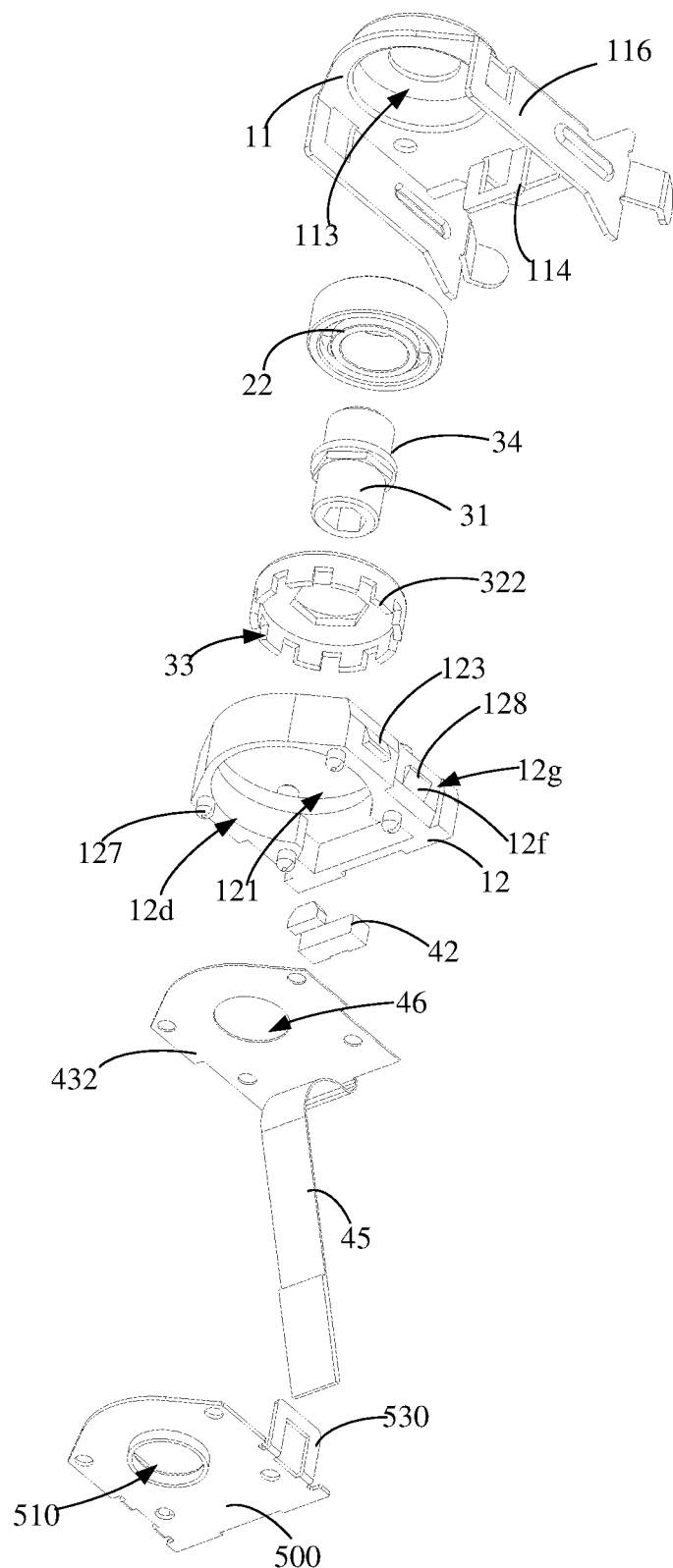
FIG. 4 is a schematic diagram of the mouse encoder in FIG. 3 viewed from another angle.
Figure 5:
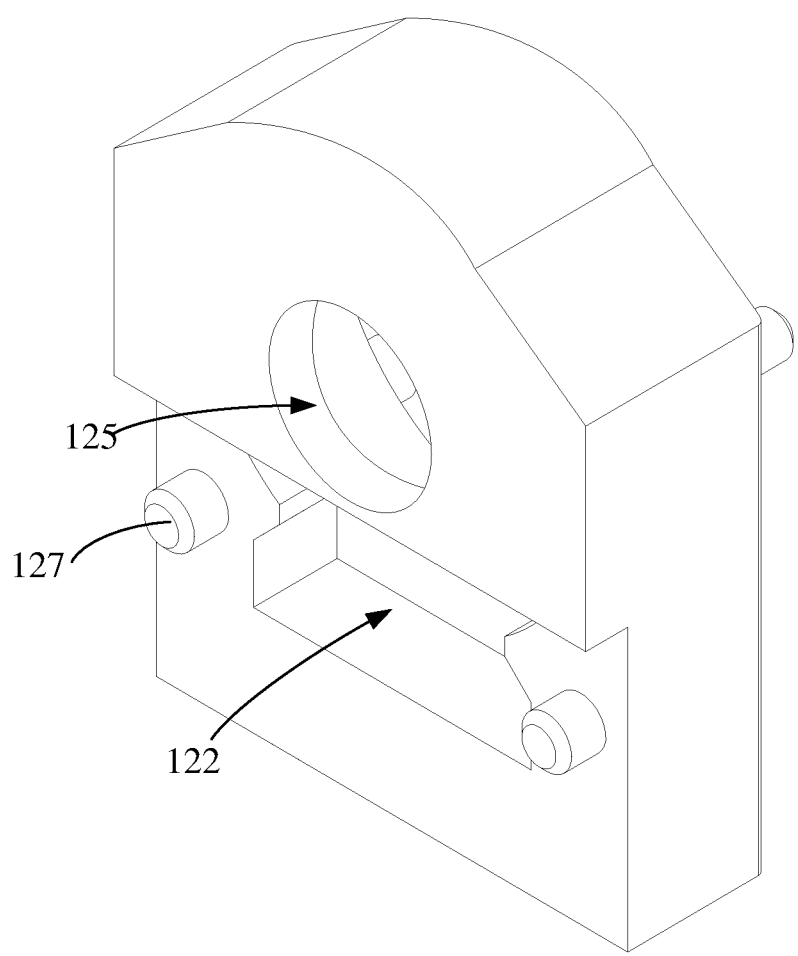
FIG. 5 is a schematic diagram of a fixing housing of the mouse encoder in accordance with an embodiment of the present disclosure.
Figure 6:
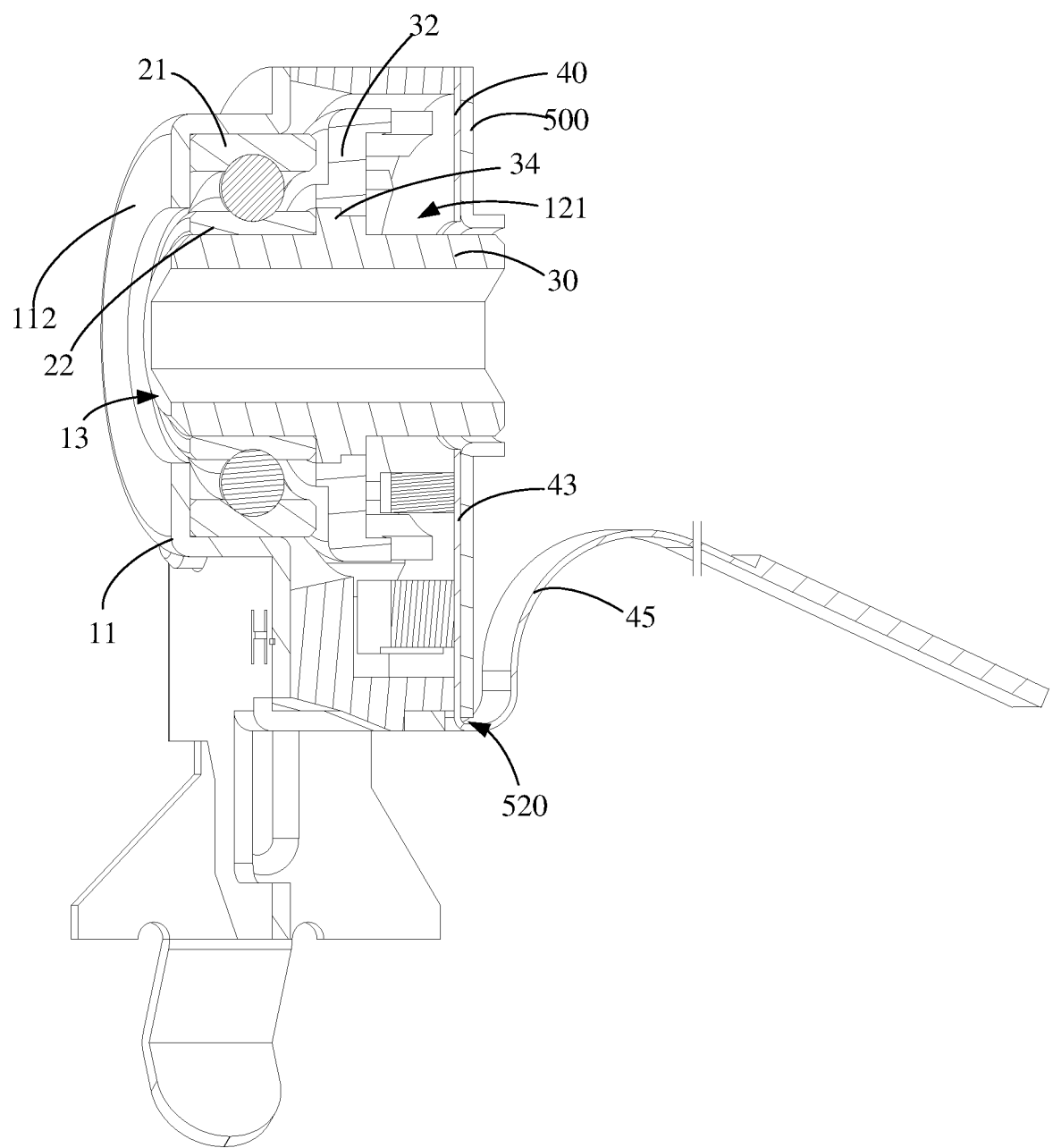
FIG. 6 is a schematic diagram showing an internal structure of the mouse encoder in FIG. 1.
Figure 7:
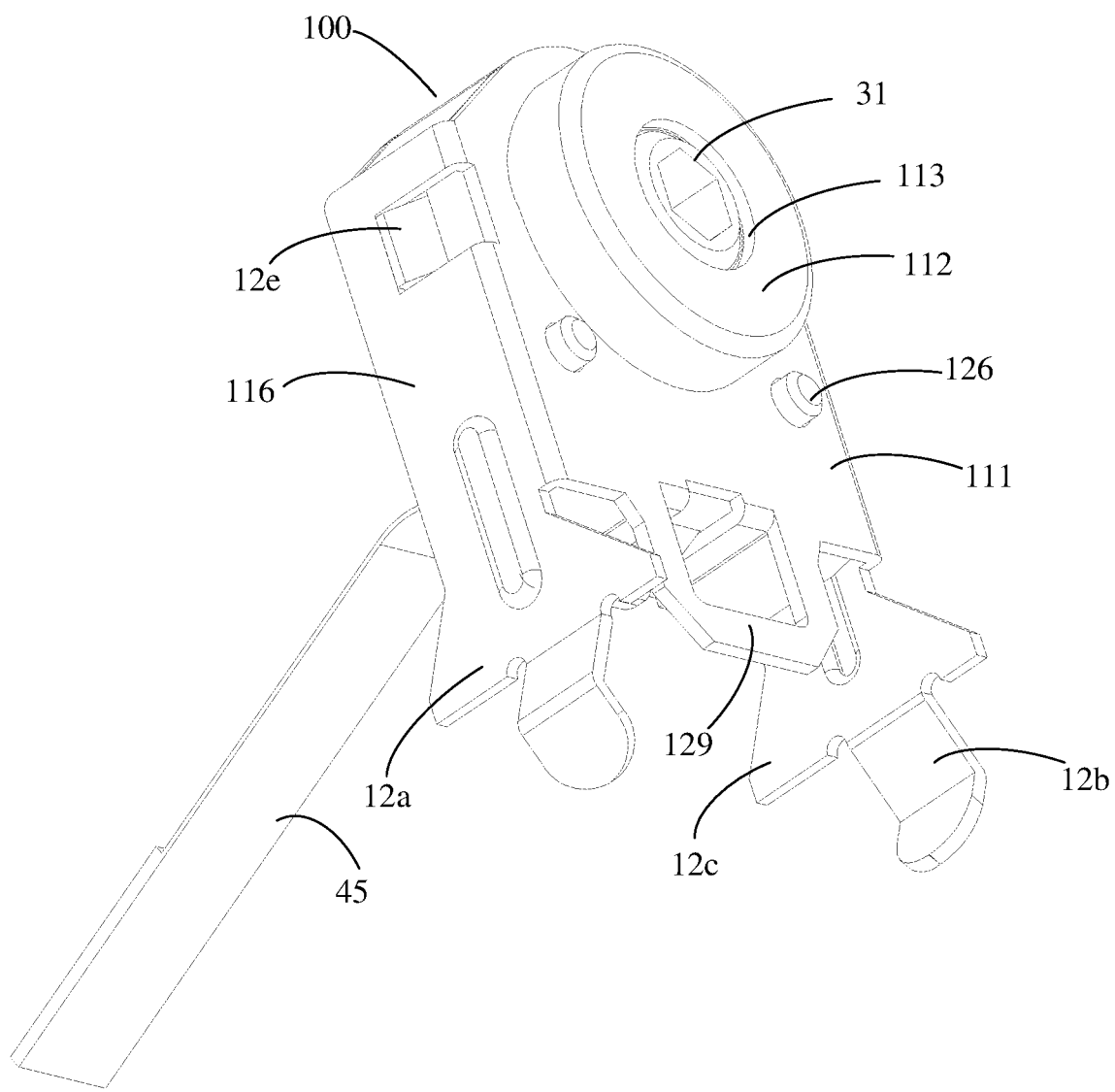
FIG. 7 is a schematic diagram of a mouse encoder in accordance with another embodiment of the present disclosure.

Referring to FIGS. 4 to 6, the housing 10 includes a mounting housing 11 and a fixing housing 12 spaced from the mounting housing 11. The mounting housing 11 includes a mounting plate 111 and a mounting portion 112 protruding from the mounting plate 111 in a direction away from the fixing housing 12. The mounting cavity 113 is formed in the mounting portion 112, and the connection hole 13 is defined in an end surface of the mounting portion 112 away from the fixing housing 12. In the embodiment, the mounting housing 11 is stretched to form the mounting portion 112 which further forms the mounting cavity 113, that is, the mounting portion 112 is integrally formed with the mounting plate 111. The overall shape of the mounting cavity 113 is the same as the overall shape of the rolling bearing member 20, and the rolling bearing member 20 is riveted in the mounting cavity 113 (an outer peripheral wall of the outer ring 21 tightly engages with the inner side wall of the mounting cavity 113), and the end surface of the rolling bearing member 20 is coplanar with the inner surface of the mounting portion 112, such that the rolling bearing member 20 can be fixed and the inner ring 22 of the rolling bearing member 20 can rotate freely. Specifically, a radial size of the connection hole 13 is greater than or equal to a radial size of the inner ring 22 of the rolling bearing member 20, so that the mounting portion 113 avoids the end surface of the inner ring facing away from the fixing housing 12; the radial size of the connection hole 13 is less than or equal to a radial size of the outer ring 21 of the rolling bearing member 20, so that the end surface of the outer ring 21 facing away from the fixing housing 12 abuts the inner wall of the mounting cavity 113 (i.e. the end surface of the outer ring 22 of the rolling bearing member 20 adjacent to the connection hole 13 abuts the inner side wall of the mounting cavity 113, that is, abuts the inner wall forming the connection hole 13). Since the rolling bearing member 20 is coaxial with the connection hole 13, when the radial size of the connection hole is greater than or equal to the radial size of the inner ring 22 of the rolling bearing member 20, the end surface of the inner ring 22 facing away from the fixing housing 12 is not in contact with the mounting portion 113 and is exposed through the connection hole 13, so that the inner ring 22 does not receive damping from the mounting portion 113 in rotation, which facilitates the inner ring 22 and the rotating cylinder 31 to rotate smoothly. When the radial size of the connection hole 13 is less than or equal to the radial size of the outer ring 21 of the rolling bearing member 20, the end surface of the outer ring 22 facing away from the fixing housing 12 abuts the inner wall of the mounting cavity 113, that is, the mounting portion 113 can limit the position of the outer ring 21, which improves the installation stability of the rolling bearing member 20 and as well facilitates the rolling bearing member 20 to be mounted at the preset position conveniently and accurately (when the rolling bearing member 20 is mounted into the mounting cavity 113 and one end surface of the outer ring 21 abuts the mounting portion 112, the rolling bearing member 20 is mounted at the preset position). Since the end surface of the outer ring 22 abuts the inner wall of the mounting portion, dust and mosquitoes, etc., can be prevented from entering the mouse encoder through the engaging position between the outer ring 21 and the mounting portion 112.

The housing 10 also has an assembly cavity communicating with the mounting cavity 113. The grating disk 32 is located in the assembly cavity, and the rotating cylinder 31 is partly located in the assembly cavity and is partly located in the mounting cavity 113. The assembly cavity is formed by enclosing the fixing housing 12 and the mounting housing 11. A rotating space 121 is formed in the fixing housing 12, and the rotating space 121 can be a part of the assembly cavity. The grating disk 32 is rotatably arranged within the rotating space 121.

The fixing housing 12 may have many forms. In some embodiments, the fixing housing 12 may be formed with a light transmitting cavity 122 for receiving the light emitter 41 and the light receiver 42. In some embodiments, the fixing housing 12 may be further formed with a through hole 125; the through hole 125 is concentric with the connection hole 13 such that the rotation shaft of the mouse can be connected to the rotating cylinder through the through hole 125. Furthermore, in some embodiments, the light transmitting cavity 122 may communicate with the through hole 125 to form a large space, which can be a part or all of the avoidance hole mentioned hereinafter, which is given in detail as follows.

The rotating space 121 is formed in the fixing housing 12, and the grating disk 32 is rotatably arranged in the rotating space 121. The light transmitting cavity 122 is formed in a lower part of the fixing housing 12, and the light transmitting cavity 122 communicates with the rotating space 121. The light emitter 41 and the light receiver 42 are arranged in the light transmitting cavity 122 and are located on both sides of the light transmitting slot 33. An end surface of a side of the fixing housing 12 away from the mounting housing 11 defines the through hole 125 which is concentric with the connection hole 13. With the connection hole 125, the rotation shaft 210 of the scroll wheel 200 can be inserted to the rotating cylinder 31 from two different directions according to actual needs. The grating disk 32 can rotate in the rotating space 121 under the action of the rotating cylinder 31. When the circuit board 40 is mounted to the fixing housing 12, both the light emitter 41 and the light receiver 42 on the circuit board 40 are located in the light transmitting cavity 122 of the fixing housing 12, and the light transmitting cavity 122 communicates with the rotating space 121. In this way, the circuit board 40 can be arranged outside the housing 10, and the light emitter 41 and the light receiver 42 cooperate with the grating disk 32 through the light transmitting cavity 122.

Figure 3:
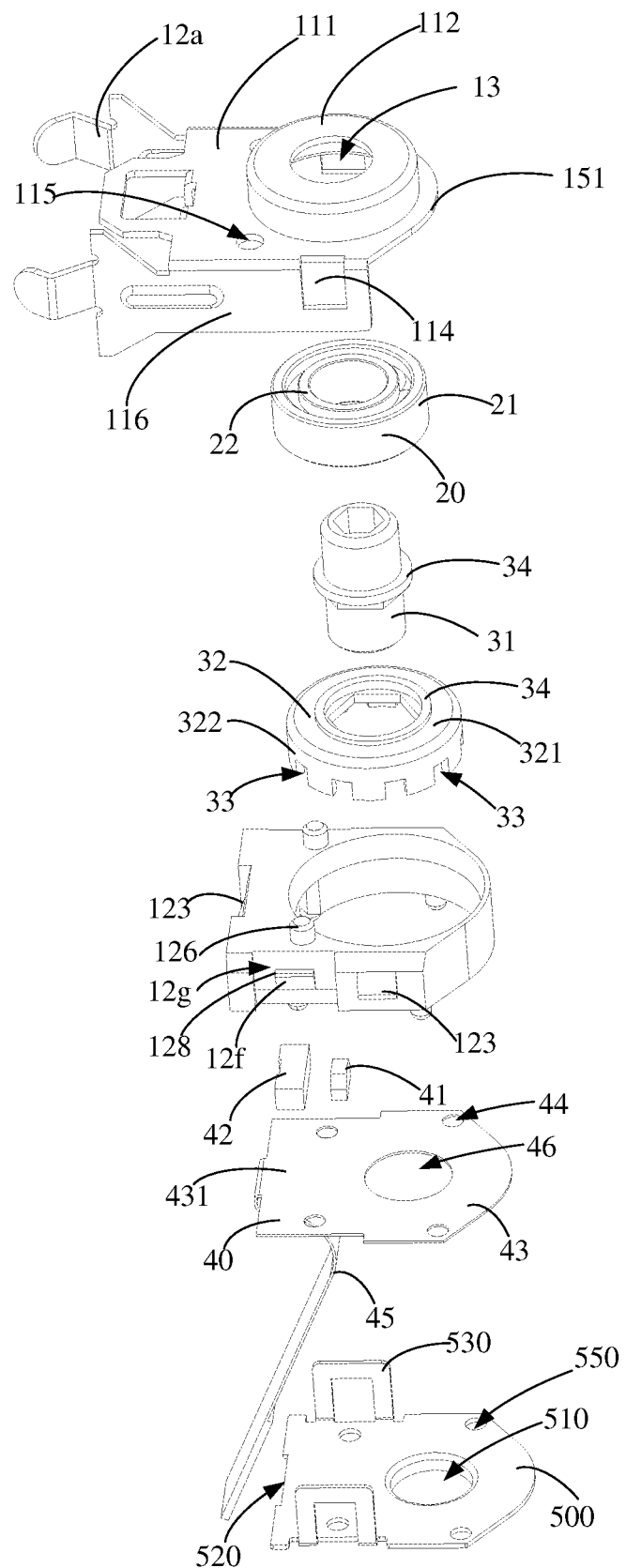
FIG. 3 is an exploded diagram of the mouse encoder in FIG. 1.

Referring to FIGS. 3 and 4, the grating disk 32 includes a connecting disk 321 and a light transmitting disk 322. The connecting disk 321 is rotatably arranged on the rotating cylinder 31. The light transmitting disk 322 extends axially from an outer edge of the connecting disk 321 in a direction away from the rolling bearing member 20, and the light transmitting slots 33 are formed in the light transmitting disk 322 at intervals. The light emitter 41 and the light receiver 42 are located on inner and outer sides of the light transmitting disk 322, respectively, so that when the grating disk 32 rotates, the optical path between the light emitter 41 and the light receiver 42 can be blocked or exposed by the light transmitting disk 322.

Since the connection platform 34 is connected between the end surface of the inner ring 22 of the rolling bearing members 20 and the connecting disk 321, thus, a gap is formed between the connecting disk 321 and the rolling bearing member 20, which ensures that the grating disk 32 is only in contact with the rotating part of the rolling bearing member 20, namely the inner ring 22, and also forms a gap between the grating disk 32 and the inner wall surface of the housing 10. Therefore, the grating disk 32 and the rolling bearing member 20 can have a synchronous rotation speed, the service life of the mouse encoder can be extended, and the mouse encoder can provide a silent effect.

Please refer to FIGS. 3 to 6, the mounting housing 11 can engage with the fixing housing 12 in a number of ways, for example, the mounting housing 11 and the fixing housing 12 can be fixed together through fasteners, can be clamped together through buckle portions, which is given in detail as follows.

A mounting hole 115 is defined in the mounting housing 11, and the side wall of the fixing housing 12 facing the mounting housing 11 is provided with a mounting post 126 engageable with the mounting hole 115. In the embodiment, the mounting post 126 on the fixing housing 12 engages with the mounting hole 115 in the mounting housing 11 such that the fixing housing 12 is detachably connected to the mounting housing 11. In some embodiments, the engagement between the mounting post and the mounting hole may be used to position the mounting housing and the fixing housing (i.e., to achieve accurate positioning of the mounting housing and the fixing housing), and the mounting housing 11 and the fixing housing 12 can be fastened together through the engagement between a buckle portion and a boss. Specifically, the mounting housing 11 further includes at least one buckle portion 114 arranged on a side and/or a bottom of the mounting housing 11, and the buckle portion 114 engages with a corresponding boss arranged on the fixing housing 12. The buckle portion can be in various forms, such as a buckle slot and a buckle hole, etc. In this embodiment, the mounting housing 11 includes two buckle portions 114 protruding from both sides of the mounting housing 11 towards the fixing housing 12 and buckle holes are defined in protruding parts of the buckle portions. When the mounting housing 11 engages with the fixing housing 12, the mounting housing 11 and the fixing housing 12 are accurately positioned through the engagement between the mounting hole 115 and the mounting post 126, and then the mounting housing 11 and the fixing housing 12 are fastened together through engagement between the buckle portion 114 and the boss. In some embodiments, another buckle portion 114 is arranged at the bottom of the mounting housing 11, which extends from the bottom of the mounting housing 11 towards the bottom of the fixing housing 12. A notch is formed at the bottom of the fixing housing 12, and a boss is arranged inside the notch to correspondingly engage with the buckle portion 114. In this way, the buckle portion 114 at the bottom of the mounting housing 11 can engage with the boss in the notch; the buckle portion 114 can be received into the notch after the buckle portion 114 is engaged with the boss, which can hide the buckle portion 114. In some embodiments, the positions of the buckle portion 114 and the boss in the above embodiment can be interchanged.

It is noted that the fixing housing 12 and the mounting housing 11 can be made of many materials, such as plastic and metal. The mounting housing 11 also includes a fixing leg 12a connected to the main board of the mouse and a supporting portion 129 abutting the main board. The number of the fixing leg 12a is two, and the supporting portion 129 is located between the two fixing legs 12a. The fixing leg 12a includes a support structure 12c and a plugging structure 12b, and the plugging structure 12b is used to be inserted into the main board. The bottom of the support structure 12c is coplanar with the bottom of the supporting portion 129, and both the support structure 12c and the supporting portion 129 abut the board surface of the main board after the assembly. The buckle portion 114 at the bottom of the mounting housing 11 can be formed by bending a part of the supporting portion 129 (the supporting portion 129 is stamped or processed through other ways to form the buckle portion 114 bent toward the mounting housing 11, the supporting portion 129 which forms the buckle portion 114 has the same process port as the buckle portion 114).

Referring to FIGS. 7 to 11, there are many possible locations and mounting forms for the circuit board 40, which are exemplarily described below.

The mouse encoder 100 further includes a fixing plate 500 arranged in parallel with the housing 10, the circuit board 40 is arranged between the housing 10 and the fixing plate 500, the fixing plate 500 is fixed to the housing 10 to clamp at least a part of the circuit board 40 between the fixing plate 500 and the housing 10.

In this embodiment, the fixing plate 500 can be a plastic fixing plate 500 or a metal fixing plate 500 and so on, which is not limited herein. Taking the fixing plate 500 being a metal fixing plate as an example, the metal fixing plate 500 can be made thinner to ensure a load-bearing capacity thereof. The fixing plate 500 being in parallel with the housing 10 means that a surface of the fixing plate 500 is arranged substantially in parallel with the housing 10, and the overall shape of the housing 10 is flat. In this way, when the fixing plate 500 and the housing 10 clamps the circuit board 40, an area of the circuit board 40 which is clamped can be significantly increased, thereby significantly increasing the stability and reliability of the installation of the circuit board 40. At the same time, by arranging the circuit board 40 outside the housing 10, the circuit board 40 does not occupy the space inside the housing 10, so that the structural arrangement (the engagement between the rolling bearing member 20, the rotating cylinder 31 and the grating disk 32) inside the housing 10 can be more compact. The fixing plate 500 and the housing 10 can be connected in many ways, such as through fasteners like screws and through buckling connections, which is not limited herein.

In this embodiment, by setting the fixing plate 500 in parallel with the housing 10, when the circuit board 40 is arranged in parallel between the fixing plate 500 and the housing 10, the circuit board 40 can be clamped between the fixing plate 500 and the housing 10 by fastening the fixing plate 500 to the housing 10, so that the circuit board 40 can be stably and reliably mounted outside the housing 10. Furthermore, the circuit board 40 is located adjacent to the housing 10 inside the grating disk 32, thus, the grating disk 32 can conveniently engage with the light emitter 41 and the light receiver 42, which significantly improves the stability of the installation of the circuit board 40 and the compactness of the structure of the mouse encoder 100.

It is noted that the light emitter 41 and the light receiver 42 can be electrically connected with the circuit board 40 in a number of ways, for example, the light emitter 41 and the light receiver 42 can be soldered or inserted to the circuit board 40. In some embodiments, the light emitter 41 and the light receiver 42 can also be electrically connected to the circuit board 40 through wires and other electrical connections.

On this basis, in order to further improve the compactness of the mouse encoder 100, the light emitter 41 and the light receiver 42 are mounted on the board surface of the circuit board 40 facing the housing 10; the housing 10 forms the rotating space 121 in which the grating disk 32 is rotatably arranged. An avoidance hole 12d is defined in a side wall of the housing 10 on which the circuit board 40 is mounted, the avoidance hole 12d communicates with the rotating space 121, the light emitter 41 and the light receiver 42 engage with the grating disk 32 through the avoidance hole 12d.

In this embodiment, the light emitter 41 and the light receiver 42 are directly mounted on the board surface of the circuit board 40, which can simplify the connection circuit between the light emitter 41 and the light receiver 42 and the circuit board 40. The avoidance hole 12d can be a round hole, oval hole, square hole, triangular hole and so on, which is not limited herein. The avoidance hole 12d is mainly used to avoid the light emitter 41 and the light receiver 42, therefore, the avoidance hole 12d at least needs to ensure that the light emitter 41 and the light receiver 42 can enter the rotating space 121 to engage with the grating disk 32. In some embodiments, the avoidance hole 12d can also be used to avoid the rotation shaft 210 of the mouse (when the rotation shaft 210 is inserted into the rotating cylinder from the side of the fixing plate 500), thus, the shape and position of the avoidance hole 12d need to be configured for realizing the installation of the rotation shaft 210. In this embodiment, in order to facilitate the processing of the avoidance hole 12d, the avoidance hole 12d is a circular hole, and the avoidance hole 12d is coaxial with the rotating space (i.e. the rotating space is in the shape of a cylinder). In this embodiment, by setting the avoidance hole 12d, the light emitter 41 and the light receiver 42 arranged on the circuit board 40 can enter the rotating space 121 from the nearest position to engage with the grating disk 32. In this way, the structure of the mouse encoder 100 is greatly simplified, and the compactness of the structure inside the housing 10 and the mouse encoder 100 is improved.

The circuit board 40 can have many forms, for example, the circuit board 40 can be a traditional printed circuit board or a flexible circuit board. In this embodiment, the circuit board 40 is a flexible circuit board. The flexible circuit board 40 includes a board body 43 and a flexible cable 45 connected to the board body 43. On end of the flexible cable 45 away from the board body 43 is configured to be inserted into the main board, and the board body 43 is clamped between the fixing plate 500 and the housing 10. Compared with the traditional printed circuit board, the board body 43 has a certain degree of flexibility. The main material of the board body 43 can be rigid rubber, and a circuit is formed in the board body 43. When the board body 43 is clamped, a certain elastic deformation can occur, such that the board body 43 can be better attached to the fixing plate 500 and the housing 10. Thus, the light emitter 41 and the light receiver 42 arranged on the board body 43 can better engage with the light transmitting disk 322, and the board body 43 can be more stably clamped. The flexible cable 45 is flexible and conductive, and one end of the board body 43 is provided with a plug which can be directly inserted into a power port of the main board of the mouse. The end of the board body 43 can be pulled out of the power port in the disassembly process. Thus, compared with the traditional printed circuit board, the flexible circuit board 40 in this embodiment can be very conveniently and reliably connected with the main board of the mouse, and the reliability problems and risks caused by welding and other processes can be avoided, which significantly simplifies the electrical connection process between the mouse encoder 100 and the main board of the mouse.

In some embodiments, to further improve the mounting stability of the circuit board 40, the board body 43 has a first board surface 431 facing the housing 10 and a second board surface 432 facing the fixing plate 500. The first board surface 431 is attached to an outer surface of the housing 10, and the second board surface 432 is attached to the surface of the fixing plate 500. In this embodiment, the first board surface 431 of the board body 43 facing the housing 10 is a flat surface or is substantially a flat surface, so that the first board surface 431 can be attached to the outer surface of the housing 10 to improve the attachment between the housing 10 and the board body 43. The second board surface 432 facing the fixing plate 500 is a flat surface or is substantially a flat surface, so that the second board surface 432 can be attached to the surface of the fixing plate 500 to improve the attachment between the board body 43 and the fixing plate 500. In this way, the fixing plate 500 can better press the circuit board 40 to the surface of the housing 10.

In some embodiments, in order to improve the working stability of the flexible cable 45 and improve the compactness of the mouse encoder 100, one end of the flexible cable 45 is connected to a connection end of the board body 43, and the avoidance notch 520 through which the flexible cable 45 passes is formed in the fixing plate 500 at a position corresponding to the connection end of the board body 43. In this embodiment, taking the overall shape of the board body 43 being rectangular as an example, the board body 43 is in parallel with the fixing plate 500, and the connection end of the board body 43 is adjacent to the main board of the mouse. The avoidance notch 520 is formed in one end of the fixing plate 500 adjacent to the main board of the mouse, corresponding to the connection position of the flexible cable 45 and the board body 43, so that the flexible cable can conveniently pass through the fixing plate 500 without being squeezed by the fixing plate 500. In this way, the risk of damage to the flexible cable 45 caused by squeeze can be reduced; meanwhile, because the avoidance notch 520 is located adjacent to the main board of the mouse, the flexible cable 45 can extend to the wring port of the main board directly without too much bending and winding. When the mouse encoder 100 is mounted on the main board, the avoidance notch 520 and the main board are enclosed to form a space to limit the flexible cable 45, which improves the stability of the installation of the flexible cable 45. It is noted that in some embodiments, the flexible printed circuit board 40 can be mounted at other positions, for example, the flexible printed circuit board 40 can be mounted on one side of the rolling bearing member 30; correspondingly, the flexible cable 45 can extend outwards from the side on which the mounting plate 111 is located. The flexible cable 45 is inserted to the main board of the mouse after extending outwards through the avoidance notch 520. In some embodiments, the flexible cable 45 can be inserted to the main board of the mouse after passing through the through hole defined in the supporting portion 129. In other embodiments, the flexible cable 45 can directly pass through the through hole defined in the supporting portion 129 without passing through the avoidance notch 520.

The connection of the fixing plate 500 to the housing 10 is exemplarily described below.

One side of the housing 10 facing the circuit board 40 is provided with a positioning post 127, a first positioning hole is defined in the circuit board 40 corresponding to the positioning post 127, and a second positioning hole 550 is defined in the fixing plate 500 corresponding to the positioning post 127. The number of the positioning posts 127 can be more than one, such as 2, 3, and 4, etc. For example, the number of the positioning posts 127 is four, and the four positioning posts 127 are arranged on the four corners of the side of the housing 10. The number of the first positioning holes and the second positioning holes 550 respectively correspond to the number of the positioning posts 127; when the number of the positioning posts 127 is four, the number of the first positioning holes and the second positioning holes 550 are also four respectively. During the installation of the circuit board 40, the circuit board 40 engages with the positioning posts 127 through the first positioning holes, and the fixing plate 500 engages with the positioning posts 127 through the second positioning holes 550. In some embodiments, the positioning post 127 can further be used to fix the fixing plate 500 and the housing 10, for example, the positioning post 127 can be a threaded post with external threads, the fixing plate 500 and the circuit board 40 can be connected to the housing 10 through the engagement between the nut and the positioning post 127. In some embodiments, the positioning post 127 can be used only to position the fixing plate 500 and the housing 10, and the fixing plate 500 can be connected to the housing 10 through other structures, such as screws and buckles, etc., which is exemplarily illustrated below.

At least one fastener 530 is arranged on a side of the fixing plate 500, at least one clamping protrusion 128 corresponding to the fastener 530 is arranged on a side of the housing 10, and the fastener 530 engages with the clamping protrusion 128. In some embodiments, the positions of the fastener 530 and the clamping protrusion 128 can be interchanged, for example, the fastener 530 is arranged on a side of the housing 10 and the clamping protrusion 128 is arranged on a side of the fixing plate 500. The fastener 530 can have many forms such as a fastening hole and a fastening slot, etc. The clamping protrusion 128 can have many forms such as a protruding block. In this embodiment, two fasteners 530 are arranged on both sides of the fixing plate 500 and two clamping protrusions 128 are arranged on both sides of the housing 10. The fasteners 530 extend from both sides of the fixing plate 500 in the direction towards the housing 10, and the clamping protrusions 128 protrude from both sides of the housing 10. The fixing plate 500 and the housing 10 can be detachably fastened together through the engagement between the clamping protrusion 128 and the fastener 530. The circuit board 40 is clamped between the fixing plate 500 and the housing 10 through the engagement between the fixing plate 500 and the housing 10.

In some embodiments, in order to improve the compactness of the structure of the mouse encoder 100, the housing 10 includes a mounting housing 11 and a fixing housing 12 spaced from the mounting housing 11. The mounting housing 11 further includes at least one buckle portion 114 arranged on a side of the mounting housing 11. The buckle portion 114 engage with a corresponding boss 123 arranged on the fixing housing 12. In this embodiment, the mounting housing 11 further two buckle portions 114 arranged on both sides of the mounting housing 11 and two bosses 123 arranged on the fixing hosing 12. The clamping protrusions 128 and the bosses 123 are arranged along a height direction of the fixing housing 12, and the buckle portions 114 and the fasteners 530 are staggered. In this embodiment, the clamping protrusions 128 and the bosses 123 are arranged on the fixing housing 12 at intervals along the height direction of the fixing housing 12. The arrangement order of clamping protrusions 128 and the bosses 123 can be adjusted; in some embodiments, the bosses 123 can be located in an upper part of the fixing housing 12 and the clamping protrusions 128 can be located in a lower part of the fixing housing 12; at this time, the fasteners 530 engaging with the clamping protrusions 128 are located in a lower part of the fixing plate 500 and the buckle portions 114 engaging with the bosses 123 are located in an upper part of the mounting housing 11. In other embodiments, the clamping protrusions 128 can be located in the upper part of the fixing housing 12 and the bosses 123 can be located in the lower part of the fixing housing 12; correspondingly, the fasteners 530 engaging with the clamping protrusions 128 are located in the upper part of the fixing plate 500 and the buckle portions 114 engaging with the bosses 123 are located in the lower part of the mounting housing 11. In this way, by arranging the clamping protrusions 128 and the bosses 123 along the height direction of the fixing housing 12, both the fixing plate 500 and the mounting housing 11 can engage with the fixing housing 12 (with the fasteners 530 and the buckle portion 114, respectively), which fully utilizes an upper space and a lower space on both sides of the fixing housing 12. Thus, the stable assembly of the fixing plate 500, the fixing housing 12, and the mounting housing 11 can be ensured while making reasonable utilization of space, and the utilization of space and the compactness of mouse encoder 100 can be improved.

In some embodiments, in order to facilitate the assembly of the mouse encoder, for example, to facilitate the assembly of the mounting housing 11 and the fixing housing 12, a first guiding slope 12e is formed on a side of the boss 123 facing the mounting housing 11 and is used to guide the buckle portion 114 to engage with the boss 123. With the first guiding slope 12e, the buckle portion 114 can be guided to move to the buckling position along the first guiding slope 12e during the assembly process, which improves the efficiency of the assembly. In order to facilitate the assembly of the fixing plate 500 and the fixing housing 12, a second guiding slope 12f is formed on a side of the clamping protrusion 128 facing the fixing plate 500 and is used to guide the fastener 530 to engage with the clamping protrusion 128. With the second guiding slope 12f, the fastener 530 can be guided to move along the second guiding slope 12f to the buckling position of the clamping protrusion 128 during the assembly process, which improves the efficiency of the assembly.

It is noted that during the assembly process, the sequence regarding the engagement of the buckle portion 114 and the boss 123 and the engagement of the fastener 530 and the clamping protrusion 128 can be variously adjusted, for example, the buckle portion 114 engages with the boss 123 at first, and then the fastener 530 engages with the clamping protrusion 128; at this time, the fastener 530 can cover the extended side wall on which the buckle portion 114 is arranged.

In some embodiments, the fastener 530 can engage with the clamping protrusion 128 at first, and then the buckle portion 114 engages with the boss 123. In this embodiment, a sink 12g is formed at the position of the clamping protrusion 128, and the clamping protrusion 128 is located on a bottom of the sink 12g. The fastener 530 is shaped as a lug, and when the fastener 530 engages with the clamping protrusion 128, the fastener 530 is received in the sink 12g. The buckle portion 114 is formed on a covering sidewall 116 of the fixing housing 12, and the covering sidewall 116 extends from an edge of the mounting plate 111 towards the fixing housing 12. The buckle portion 114 engages with the boss 123, and two covering sidewalls 116 cover both sides of the fixing housing 12 and the engaging positions of the fasteners 530 and the clamping protrusions 128. Meanwhile, with the sink 12g, the covering sidewall 116 can be attached to the side wall of the housing (the fastener 530 engages with the clamping protrusion 128 and the two are hidden in the sink 12g), so that the overall width of the mouse encoder 100 is significantly reduced, and the compactness of the structure of the mouse encoder 100 is improved.

The fixing plate 500 can have many forms, such as a fully-enclosed plate and a plate with via, as explained below.

In the case where the fixing plate 500 is fully enclosed, there are two working conditions; in one working condition the circuit board 40 has a first via 46; in the other working condition, the circuit board 40 is a complete board without a first via 46. In some embodiments, the circuit board 40 is a complete board blocking the avoidance hole 12d; in other embodiments, the circuit board 40 has a first via 46, the circuit board 40 covers the avoidance hole 12d and the fixing plate 500 blocks the first via 46. In this embodiment, the fixing plate 500 is a complete board, and a region of the fixing plate 500 corresponding to the avoidance hole 12d is not formed with a hole structure such as a second via 510. On this basis, the circuit board 40 can be formed with or without the first via 46. When the circuit board 40 is formed with the first via 46, the first via 46 corresponds to the avoidance hole 12d and the fixing plate 500 blocks the first via 46, so that the side of the housing 10 facing the fixing plate 500 is covered, which avoids dust, mosquitoes, and water, etc. of the external environment of from entering into the housing 10. It is noted that the circuit board 40 can be also used in the case where the rotation shaft 210 is inserted from both sides of the mouse encoder 100, so that the adaptability of the circuit board 40 can be greatly improved.

When the circuit board 40 is not formed with the first via 46, the circuit board 40 covers the avoidance hole 12d and the fixing plate 500 presses the circuit board 40, thus, the side of the housing 10 facing the fixing plate 500 is covered.

In the case where the fixing plate 500 is not fully enclosed, the circuit board 40 is provided with the first via 46 and the fixing plate 500 is provided with the second via 510 corresponding to the first via 46. The first via 46 and the second via 510 communicate with the rotating space 121 and the mounting cavity 113 through the avoidance hole 12d, so that the rotation shaft 210 of the scroll wheel 200 can be connected to the rolling bearing member 20 through the first via 46, the second via 510, the avoidance hole 12d and the rotating space 121. In this embodiment, with the first via 46 and the second via 510, the space inside the housing 10 can communicate with the external environment through the avoidance hole 12d, the first via 46, and the second via 510, thus, the rotation shaft 210 can reach into the housing 10 to be inserted to the rotating cylinder 31, or the end of the rotating cylinder 31 away from the connection hole 13 can extend to the avoidance hole 12d, the first via 46, and the second via 510, such that the rotation shaft 210 can be inserted to the rotating cylinder 31. At this point, the rotation shaft 210 can be connected to both sides of the mouse encoder 100, which allows the mouse encoder 100 to be applied to more working conditions and significantly improves the adaptability of the mouse encoder 100.

Figure 8:
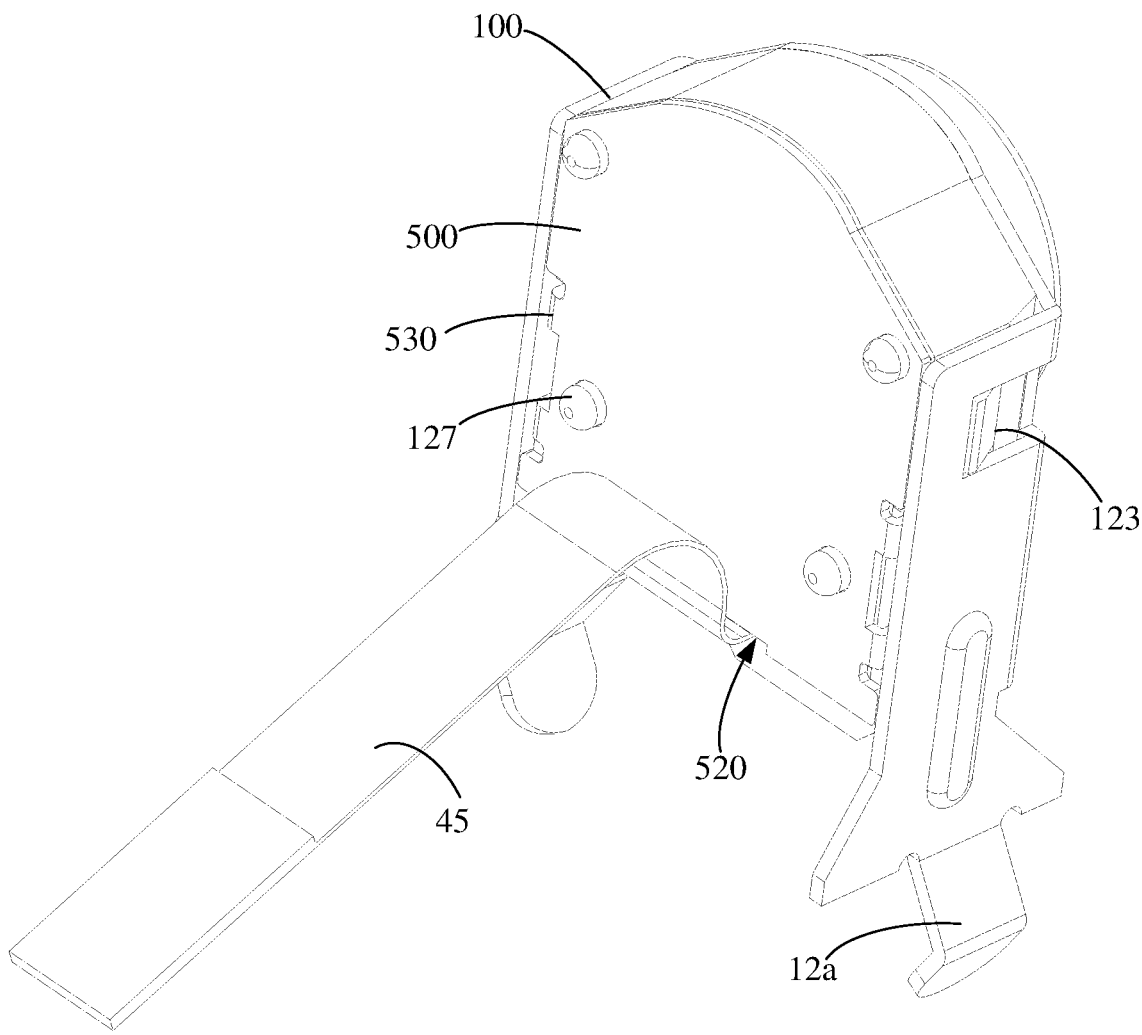
FIG. 8 is a schematic diagram of the mouse encoder in FIG. 7 viewed from another angle.
Figure 9:
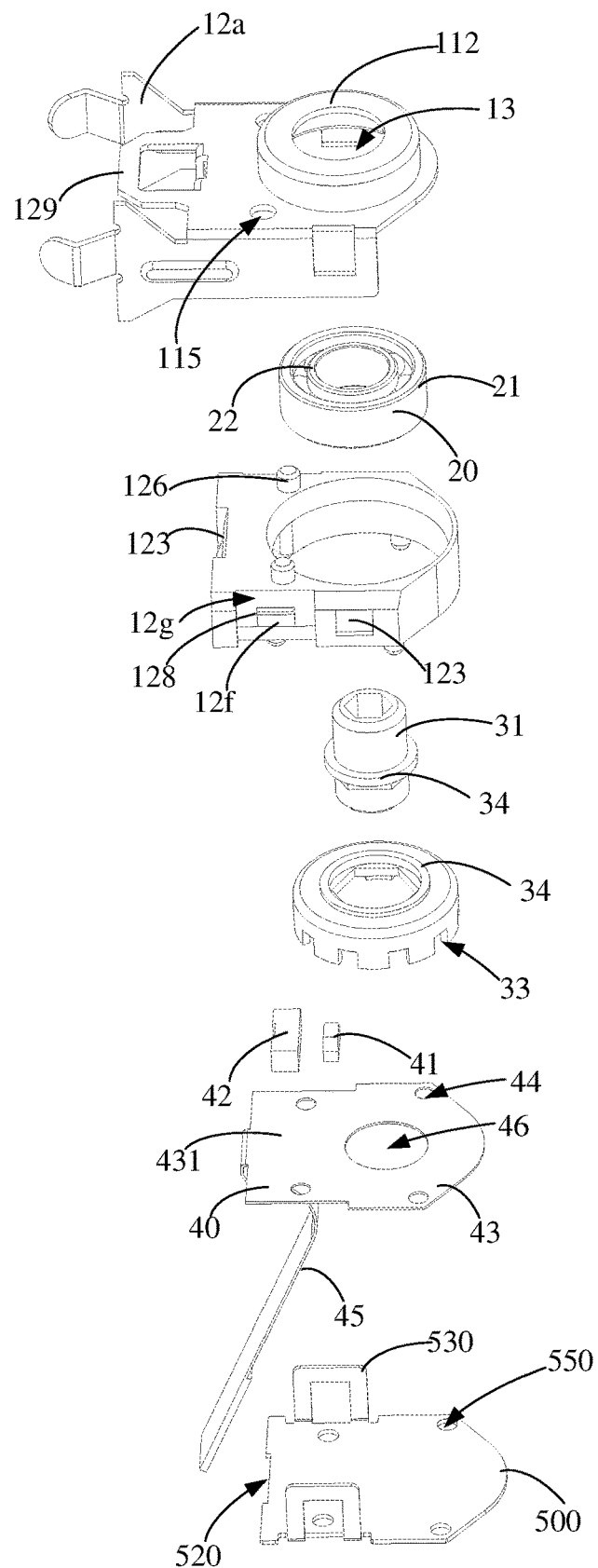
FIG. 9 is an exploded diagram of the mouse encoder in FIG. 7.
Figure 10:
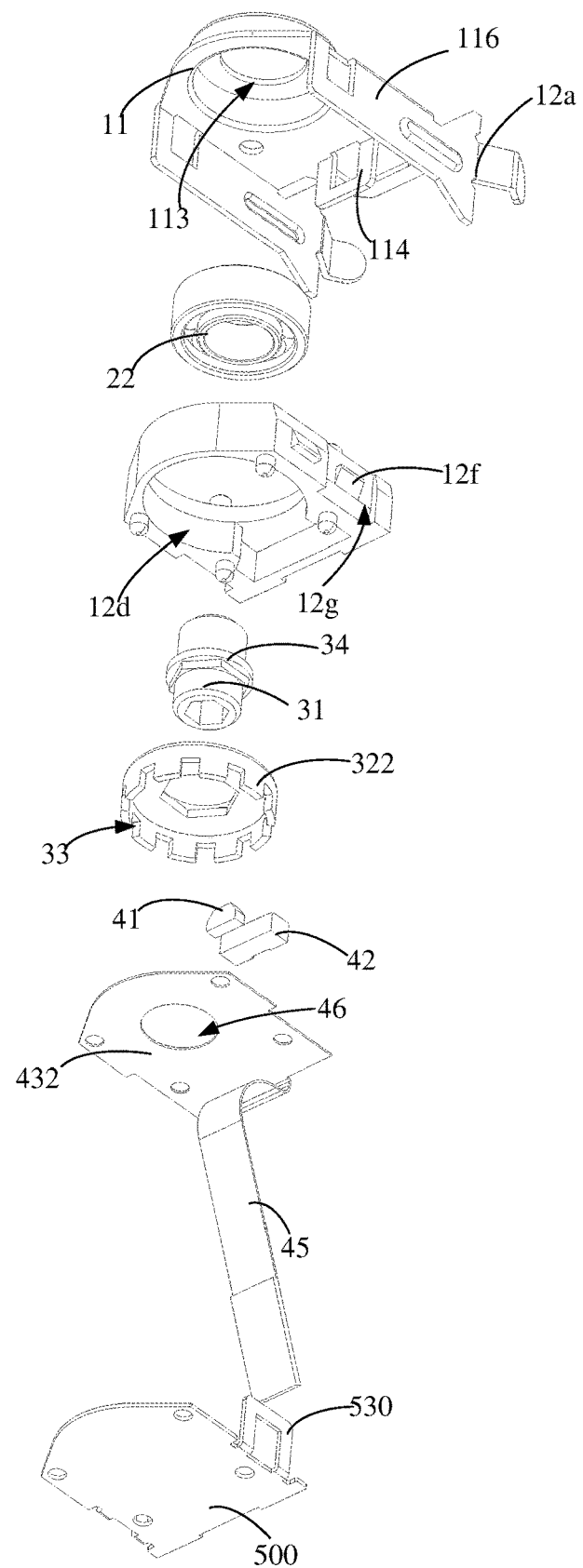
FIG. 10 is a schematic diagram of the mouse encoder in FIG. 9 viewed from another angle.
Figure 11:
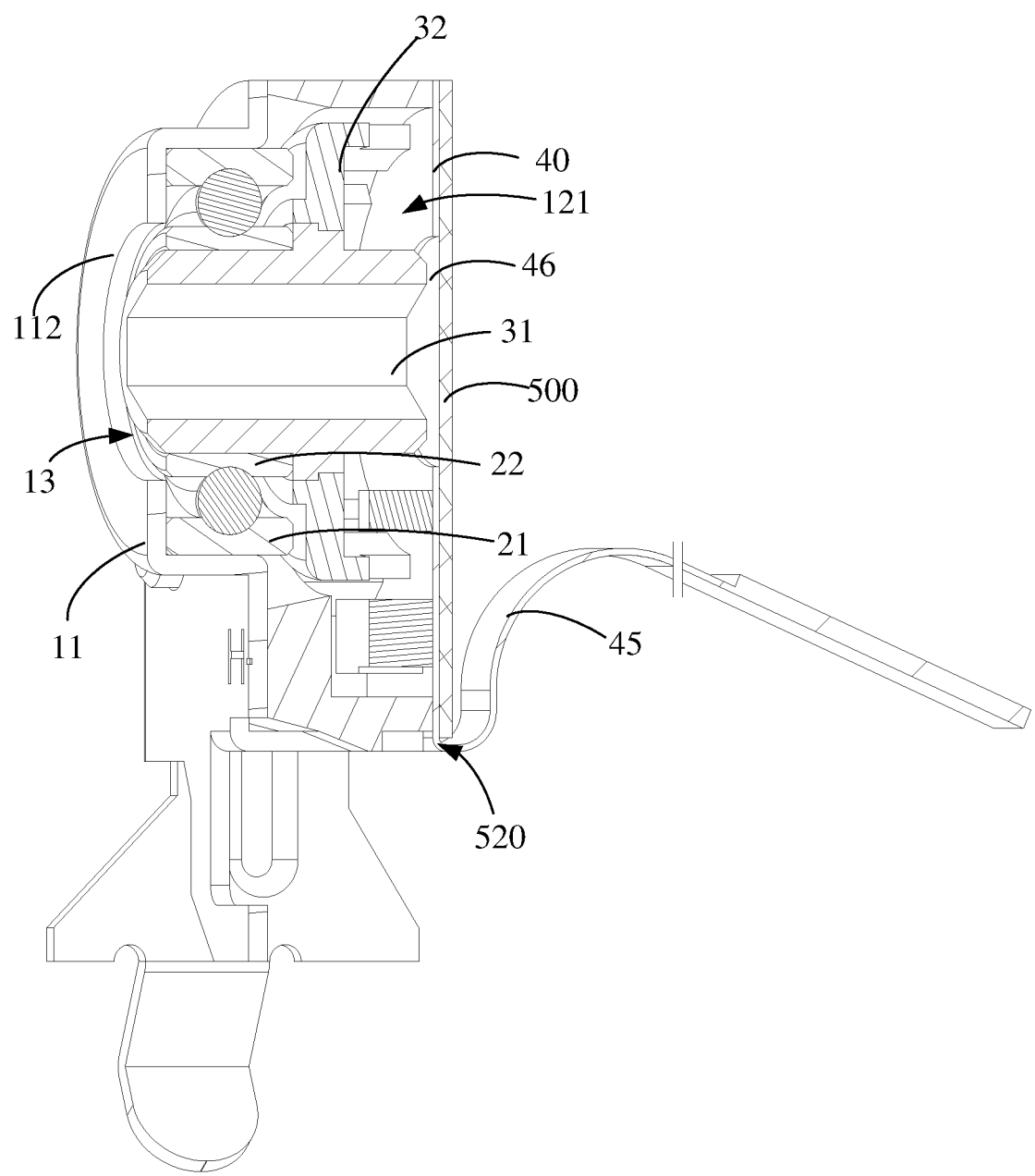
FIG. 11 is a schematic diagram showing an internal structure of the mouse encoder in FIG. 7.

Referring to FIG. 8, the present disclosure further provides a mouse and the mouse includes the mouse encoder 100 and the scroll wheel 200. Since the mouse includes the mouse encoder 100, the mouse employs all of the technical solutions of all of the above embodiments of the mouse encoder 100 and therefore has at least all of the beneficial effects of the technical solutions of the above embodiments, which will not be repeated herein. It will be appreciated that the mouse also includes other parts, such as a housing, etc.

The above descriptions are only optional embodiments of the application, and do not limit the scope of the patents of the present application. All the equivalent structural transformations made by the content of the specification and drawings of the present application under the creative concept of the present application, or directly/indirectly used in other related technical fields are all included in the protection scope of the patents of the present application.

What is claimed is:

1. A mouse encoder, comprising:
    a housing provided with a mounting cavity, wherein an end surface of the housing defines a connection hole connected with a rotation shaft of a scroll wheel, and the connection hole communicates with the mounting cavity;
    a rolling bearing member arranged in the mounting cavity and an outer ring of the rolling bearing member fixed to an inner wall surface of the mounting cavity;
    a grating member, comprising a rotating cylinder and a grating disk sleeved on the rotating cylinder, wherein the grating disk has a plurality of light transmitting slots arranged along a circumference thereof at intervals, the rolling bearing member is sleeved on the rotating cylinder, and an axis of the connection hole, an axis of the rotating cylinder and an axis of the rolling bearing member all lie in a same straight line; and
    a circuit board arranged in the housing, wherein the circuit board is electrically connected with a light emitter and a light receiver, the circuit board is configured to electrically connect with a main board of the mouse, the light emitter is conductive with the light receiver to form an optical path, when the rotating cylinder rotates, the grating disk is driven by the rotating cylinder to block or expose the optical path;
    wherein the housing comprises a mounting housing and a fixing housing spaced from the mounting housing, the mounting housing comprises a mounting plate; a mounting portion is arranged on the mounting plate and protrudes in a direction away from the fixing housing, the mounting cavity is formed in the mounting portion, and the connection hole is defined in an end surface of the mounting portion away from the fixing housing.

2. The mouse encoder according to claim 1, wherein the grating member further comprises a connection platform radially protruding from an outer wall surface of the rotating cylinder; a side wall of the connection platform adjacent to the rolling bearing member is connected to and in contact with an end surface of an inner ring of the rolling bearing member, and a side wall of the connection platform away from the rolling bearing member is connected to the grating disk; a diameter of the connection platform is greater than an outer diameter of the inner ring of the rolling bearing member and is less than an inner diameter of the outer ring of the rolling bearing member, such that the grating member is fixed only to the inner ring of the rolling bearing member without being in contact with the outer ring of the rolling bearing member and other assembled parts.

3. The mouse encoder according to claim 1, wherein the mounting housing further comprises at least one buckle portion arranged on a side and/or a bottom of the mounting housing, the buckle portion engage with a corresponding boss arranged on the fixing housing; and/or
    the housing further forms an assembly cavity communicating with the mounting cavity, the grating disk is located in the assembly cavity, and the rotating cylinder is located partly in the assembly cavity and partly in the mounting cavity.

4. The mouse encoder according to claim 1, wherein a rotating space is formed inside the fixing housing, and the grating disk is rotatably arranged in the rotating space; a light transmitting cavity is formed in a lower part of the fixing housing, and the light transmitting cavity communicates with the rotating space; the light emitter and the light receiver are arranged in the light transmitting cavity and are respectively located on both sides of the light transmitting slot.

5. The mouse encoder according to claim 4, wherein a through hole is defined in an end surface of a side wall of the fixing housing away from the mounting housing, the through hole communicates with the rotating space and is concentric with the connection hole.

6. The mouse encoder according to claim 5, wherein the mounting housing defines a mounting hole and a mounting post engageable with the mounting hole is arranged on a side wall of the fixing housing facing the housing; and/or
    the light transmitting cavity communicates with the through hole.

7. The mouse encoder according to claim 1, wherein a radial size of the connection hole is greater than or equal to that of the inner ring of the rolling bearing member such that the mounting portion avoids an end surface of the fixing housing away from the inner ring; the radial size of the connection hole is less than or equal to that of the outer ring of the rolling bearing member such that an end surface of the outer ring adjacent to the connection hole abuts an inner side wall of the mounting cavity.

8. The mouse encoder according to claim 1, wherein the grating disk comprises a connecting disk and a light transmitting disk, the connecting disk is arranged on the rotating cylinder and is capable of rotating with the rotating cylinder, the light transmitting disk extends axially from an outer edge of the connecting disk in a direction away from the rolling bearing member, and the light transmitting slots are formed at intervals in the light transmitting disk; and/or the rotating cylinder is detachably connected to the grating disk.

9. The mouse encoder according to claim 1, wherein the mouse encoder further comprises a fixing plate in parallel with the housing, the circuit board is arranged between the housing and the fixing plate, the fixing plate is fastened to the housing to clamp at least a part of the circuit board.

10. The mouse encoder according to claim 9, wherein the light emitter and the light receiver are arranged on a board surface of the circuit board facing the housing; the housing forms a rotating space in which the grating disk rotates, an avoidance hole is defined in a side wall of the circuit board on which the circuit board is mounted; the avoidance hole communicates with the rotating space, and the light emitter and the light receiver engage with the grating disk through the avoidance hole.

11. The mouse encoder according to claim 10, wherein the circuit board is a complete board, the circuit board blocks the avoidance hole; or a first via is defined in the circuit board, the circuit board covers the avoidance hole, and the fixing plate blocks the first via.

12. The mouse encoder according to claim 10, wherein a first via is defined in the circuit board and a second via corresponding to the first via is defined in the fixing plate, the first via and the second via communicate with the rotating space and the mounting cavity through the avoidance hole, such that the rotation shaft of the scroll wheel can be connected with one end of the rotating cylinder away from the connection hole through the first via, the second via, and the avoidance hole.

13. The mouse encoder according to claim 9, wherein the circuit board is a flexible circuit board comprising a board body and a flexible cable connected to the board body; an end of the flexible cable away from the board body is configured to be inserted to a main board, and the board body is clamped between the fixing plate and the housing.

14. The mouse encoder according to claim 13, wherein the board body has a first board surface facing the housing and a second board surface facing the fixing plate, the first board surface is attached to a surface of the housing, and the second board surface is attached to the fixing plate; and/or one end of the flexible cable is connected to a connection end of the board body, and an avoidance notch is formed in the fixing plate corresponding to the connecting end through which the flexible cable can pass.

15. The mouse encoder according to claim 9, wherein at least one fastener is arranged on a side of the fixing plate, and at least one clamping protrusion corresponding to the fastener is arranged on a side of the housing, and the fastener engages with the clamping protrusion.

16. The mouse encoder according to claim 15, wherein the housing comprises a mounting housing and a fixing housing spaced from the mounting housing, the mounting housing further comprises at least one buckle portion arranged on a side of the mounting housing, and the buckle portion engages with a corresponding boss arranged on the fixing housing; the clamping protrusion and the boss are arranged along a height direction of the fixing housing, and the buckle portion and the fastener are staggered.

17. The mouse encoder according to claim 16, wherein a side of the boss facing the mounting housing forms a first guiding slope used to guide the buckle portion to engage with the boss; and/or a side of the clamping protrusion facing the fixing plate forms a second guiding slope used to guide the fastener to engage with the boss; and/or at least one sink is formed in a of the fixing housing, the clamping protrusion is located in the corresponding sink, when the fastener engages with the corresponding boss, the fastener is received in the corresponding sink; the mounting housing comprises a mounting plate and a covering sidewall extending from the mounting plate towards the fixing housing, the fastener is formed on the covering sidewall; when the fastener engages with the corresponding boss, and the covering sidewall covers the corresponding side of the fixing housing and the corresponding sink.

18. The mouse encoder according to claim 9, wherein a positioning post is arranged on one side of the housing facing the circuit board, a first positioning hole is defined in the circuit board corresponding to the positioning post, a second positioning hole is defined in the fixing plate corresponding to the positioning post, the positioning post is inserted in the first positioning hole and the second positioning hole.

19. A mouse, comprising a main board and the mouse encoder according to claim 1, wherein the mouse encoder is mounted on the main board.

* * * * *